(12) United States Patent
Reese et al.

(10) Patent No.: US 8,581,617 B2
(45) Date of Patent: Nov. 12, 2013

(54) SYSTEMS AND METHODS FOR PROVIDING USER-INITIATED LATCH UP TO DESTROY SRAM DATA

(75) Inventors: Dirk A. Reese, Campbell, CA (US); Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 53 days.

(21) Appl. No.: 13/097,787

(22) Filed: Apr. 29, 2011

(65) Prior Publication Data
US 2012/0274350 A1 Nov. 1, 2012

(51) Int. Cl.
*H03K 19/00* (2006.01)
(52) U.S. Cl.
USPC .................................. 326/8; 326/14; 326/15
(58) Field of Classification Search
USPC ............................... 326/8–15; 726/22, 26, 34
See application file for complete search history.

(56) References Cited

U.S. PATENT DOCUMENTS

| | | | |
|---|---|---|---|
| 5,552,338 A | 9/1996 | Kang | |
| 5,736,777 A | 4/1998 | Shield et al. | |
| 5,768,372 A | 6/1998 | Sung et al. | |
| 5,915,017 A | 6/1999 | Sung et al. | |
| 8,174,285 B2 * | 5/2012 | Buard et al. | 326/15 |
| 2006/0109117 A1 | 5/2006 | Hsu et al. | |
| 2009/0070887 A1 | 3/2009 | Knowles et al. | |
| 2011/0043245 A1 | 2/2011 | Buard et al. | |

OTHER PUBLICATIONS

"Operating Requirements for Altera Devices," Altera, Data Sheet, Version 9.02, Dec. 1999, pp. 1-14.
Plummer, James D. et al., "Silicon VLSI Technology: Fundamentals, Practice and Modeling," Prentice Hall, Upper Saddle River, New Jersey, 2000, pp. 466-468.

* cited by examiner

*Primary Examiner* — Vibol Tan
(74) *Attorney, Agent, or Firm* — Ropes & Gray LLP; Sameer K. Pai (57) ABSTRACT

Systems and methods are provided for destroying or erasing circuitry elements, data, or both, such as transistors, volatile keys, or fuse blocks, located in an integrated circuit device. An initiation signal may be provided to induce latch-up in a circuitry element in response to a user command, a tampering event, or both. As a result of the latch-up effect, the circuitry element, data, or both may be destroyed or erased.

21 Claims, 7 Drawing Sheets

SYSTEMS AND METHODS FOR PROVIDING USER-INITIATED LATCH UP TO DESTROY SRAM DATA

FIELD OF THE DISCLOSURE

This disclosure relates to systems and methods for securing the programming data of a programmable device—e.g., a field-programmable gate array (FPGA) or other programmable logic device (PLD)—against copying and other tampering.

BACKGROUND OF THE DISCLOSURE

Programmable logic devices that store their configuration data in static random access memory ("SRAM") storage have the advantage of being smaller and faster than the devices based on erasable programmable read-only memory ("EPROM") technology. However, SRAM storage is volatile; it does not retain its contents when power is lost. Therefore, programmable logic devices based on SRAM technology are used with nonvolatile storage to retain the configuration programming data, including vendor-provided proprietary configuration data for various commonly-used functions (frequently referred to as "intellectual property cores"), during times that the device is switched off or otherwise not provided with power. Such nonvolatile storage may be provided, for example, in the form of Flash memory, although any form of nonvolatile storage may be used, and it may be either on, or separate from, the device.

Unfortunately, an authorized user may nonetheless access the sensitive information by circumventing the security features.

Earlier systems addressed this concern by implementing various security measures, such as encryption algorithms. Commonly-assigned U.S. Pat. Nos. 5,768,372 and 5,915,017, each of which is hereby incorporated by reference herein in its respective entirety, describe the encryption of the configuration data stored in the nonvolatile storage and its decryption upon loading into the programmable device. However, some encryption keys can be deciphered by bombarding the device with false configuration data and analyzing the device's response to the false data. It is particularly difficult to secure against this type of attack because it is performed before the device enters the user-mode, where many security algorithms are implemented.

SUMMARY OF THE DISCLOSURE

The present disclosure relates to systems and methods for destroying or erasing data, circuitry elements, or both stored in a programmable integrated circuit device.

In accordance with some embodiments of the present disclosure, a programmable integrated circuit device having a circuitry element and logic circuitry is provided. The circuitry element is initially coupled to a negative supply voltage. The logic circuitry is operable to decouple the circuitry element from the negative supply voltage and couple the decoupled circuitry element to a positive supply voltage. As a result, latch-up may be induced in the circuitry element and the circuitry element may be destroyed.

Methods of operating such programmable integrated circuit devices are also provided.

BRIEF DESCRIPTION OF THE DRAWINGS

Features of the disclosure, its nature, and various advantages will be apparent upon consideration of the following detailed description, taken in conjunction with the accompanying drawings, in which like reference characters refer to like parts throughout, and in which.

DETAILED DESCRIPTION OF EMBODIMENTS

Generally, programmable integrated circuit devices, such as FPGAs, include complementary metal-oxide-semiconductor ("CMOS") circuitry elements and logic circuitry for performing logic functions. CMOS is a technology for constructing integrated circuits ("ICs") using complementary and symmetrical pairs of p-type and n-type metal oxide semiconductor field effect transistors ("MOSFETs"), referred to as PMOS transistors and NMOS transistors, respectively. Circuitry elements may include, for example, semiconductor regions, diodes, NMOS transistors, PMOS transistors, signal lines, interconnects, logic gates (e.g., AND, OR, NAND, NOR), static random access memory SRAM, volatile or non-volatile memory elements, any other suitable element or structure, or any combination thereof. In some embodiments, circuitry elements may store data.

One of the primary concerns with CMOS devices is their susceptibility to latch-up. Latch-up is a type of short circuit created by a low-impedance path between the power supply lines of an integrated circuit (e.g., a MOSFET circuit) that leads to a parasitic structure (e.g., a PNP parasitic bipolar transistor and an NPN parasitic bipolar transistor) which may disrupt proper functioning of the integrated circuit. The parasitic structure is functionally equivalent to a parasitic n-p-n-p or p-n-p-n thyristor or silicon controlled rectifier (SCR) which latches in the on state, destroying the circuit operation. This parasitic structure creates an amplified path between the positive supply voltage and the negative supply voltage that leads to the destruction of circuitry.

CMOS circuits may be designed in such a way as to prohibit latch-up from happening. For example, the substrates of CMOS transistors may be biased in a particular manner (e.g., by grounding the p-substrate of an NMOS transistor, by connecting the n-well of a PMOS transistor to the highest available voltage) to prevent latch-up by turning off intrinsic bipolar transistors.

In response to tampering or unauthorized access to a programmable device, various data destruction techniques may be employed to destroy or erase sensitive information stored on the device. In some embodiments, the data destruction system of the present disclosure may destroy circuitry, erase data, or both. For example, SRAM data remanence may be reduced or eliminated by turning off latch-up prevention mechanisms and forward biasing inherent parasitic bipolar transistors to induce latch-up in an area of the device such as the volatile key, the fuse block, any other suitable area, or any combination thereof. In some embodiments, the user may have control over destroying selected circuitry, erasing data, or both in response to security concerns. In some embodiments, selected circuitry may automatically be destroyed, data may automatically be erased, or both in response to a tampering event.

In some embodiments, specific transistors may be controlled by user intellectual property cores that may be operating in the FPGA fabric. These transistors, when set to a certain state by the user-IP, cause latch-up in certain registers, such as key storage registers.

In some embodiments, a command code may be used to initiate latch-up. In some embodiments, the entering of the command code may be required to avoid inadvertent initiation of latch-up. For example, user intellectual property that is operating in the FPGA fabric may shift-in a specific command code into a control module, e.g., a controller statemachine fabricated in a silicon substrate. In one example, if the command code matches the command to initiate latch-up, the control module may pull-down an active low signal. The active low signal may be referred to as an initiation signal. Once the signal is driven low, latch-up may occur and erase targeted data, destroy circuitry elements, or both. In another example, the initiation signal may be an active high signal that may be driven low in order to erase targeted data, destroy circuitry elements, or both. The examples provided herein are merely illustrative and may be performed using any suitable methods or implementations.

In some embodiments, a gating system may be implemented to prevent inadvertent initiation of latch-up. The gating system may include any suitable hardware for preventing inadvertent latch-up. For example, the gating system may include logic circuitry (e.g., MOSFETs) to prevent inadvertent latch-up.

Illustrative features of the present disclosure are described with reference to FIGS. 1-7 below.

Figure 1:
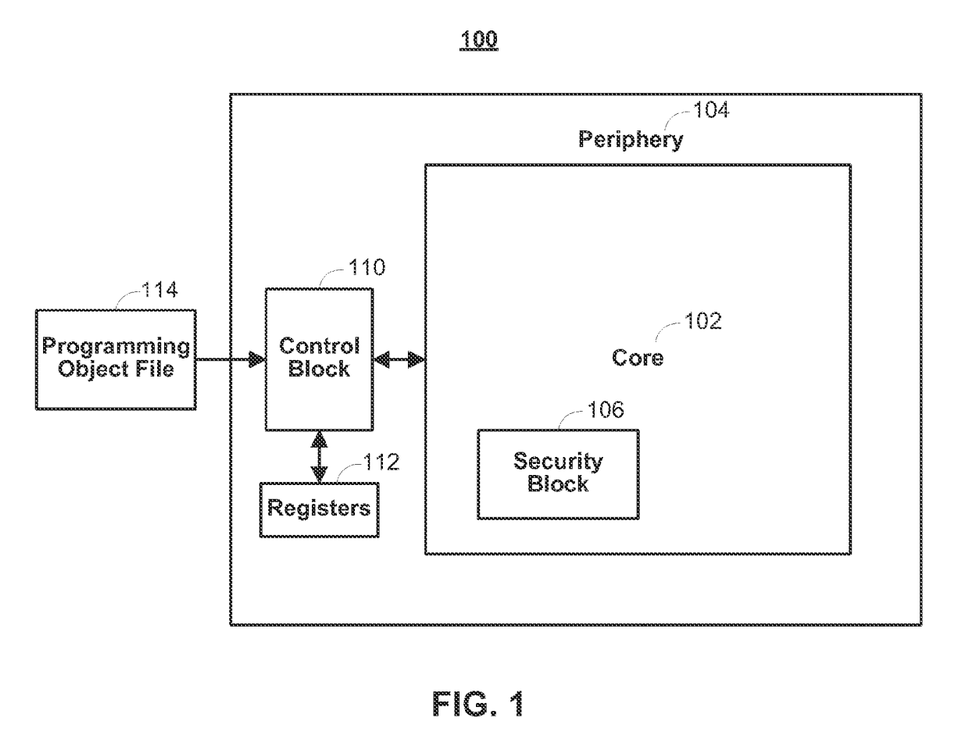
FIG. 1 is a block diagram of an illustrative integrated circuit device in accordance with some embodiments.

FIG. 1 is a block diagram of illustrative integrated circuit device 100 in accordance with some embodiments of the present disclosure. Integrated circuit device 100 is one example of a suitable architecture used in connection with implementing a data destruction system having circuitry destruction capabilities. For example, device 100 may include specific transistors that may be controlled by user intellectual property that may be operating in the fabric of a field programmable gate array ("FPGA") in accordance with some embodiments of the present disclosure. In some embodiments, other architectures may be used and may include more or fewer components than those illustrated.

In some embodiments, integrated circuit device 100 may be, or may be referred to as, an integrated circuit, a programmable integrated circuit, a programmable integrated circuit device, a programmable logic device, a programmable logic resource, an FPGA, any other suitable nomenclature, or any combination thereof. For example, device 100 may be an FPGA. In another example, device 100 may be an application-specific integrated circuit ("ASIC").

Programmable integrated circuit device 100 may include core 102, periphery 104, any other suitable component, or any combination thereof. In some embodiments, device 100 may include circuitry suitable for communicating with device components. For example, the components shown in device 100 may be coupled with each other via any suitable wired, wireless, or both communications paths, which may use any suitable hardware, software, or both for facilitating the transfer of data and control signals between components.

Core 102 may include any suitable programmable logic circuitry that may be configured according to configuration data that has been programmed by, for example, a user. For example, core 102 may be operable to handle a particular type of digital signal processing algorithm or any other suitable operation as programmed by a user. In some embodiments, core 102 may include security block 106, which may process various anti-tampering operations of device 100. For example, security block 106 may employ anti-tampering techniques for device 100 once device 100 has been configured.

Periphery 104 may include control block 110 and registers 112. In some embodiments, periphery 104 may include circuitry suitable for communicating with a peripheral device. A peripheral device may include, for example, a second programmable integrated circuit device, a user equipment device, a server, a database, any other suitable device, or any combination thereof. The communications circuitry may include, for example, a USB interface, an IEEE 1394 interface, an SVGA interface, an input/output ("I/O") port, a JTAG I/O port, a modem, a wireless interface, any other suitable circuitry or interface, or any combination thereof.

Control block 110 may generally control the configuration of core 102 and may handle various other tasks associated with the configuration of core 102, such as encryption, decryption, compression, decompression, any other suitable process, or any combination thereof.

In some embodiments, control block 110 may receive programming object file ("POF") 114 through any suitable wired, wireless, or both communications path, interface, or both. POF 114 may include, for example, configuration data from a user or manufacturer that may be used to configure core 102, various security options (e.g., anti-tampering security options stored in registers 112 or security block 106), or both.

Registers 112 may be located in periphery 104, core 102, any other suitable location, or any combination thereof. In some embodiments, registers 112 may include any suitable types of volatile, nonvolatile, or both registers for storing, for example, encryption keys, security option information, security option configurations, any other suitable information, or any combination thereof.

In some embodiments, registers 112 may include data, one or more circuitry elements, or both such as one or more registers, CMOS circuitry elements, batteries, fuses, any other suitable circuitry elements or data, or any combination thereof. For example, registers 112 may include SRAM circuitry elements that store data. The stored data may be selectively erased and/or the SRAM circuitry elements may be selectively destroyed by the data destruction system of the present disclosure.

In some embodiments, registers 112 may be used to store an encryption key that may be used by control block 110 to decrypt, encrypt, or both the configuration data in POF 114. In some embodiments, the encryption key may be based on the advanced encryption standard ("AES").

In some embodiments, device 100 may be coupled to a user equipment device to provide access to or the ability to destroy or erase selected portions of device 100. A user equipment device may include, for example, any suitable hardware, software, or both for providing interaction with a user, facilitating the transfer of data and control signals. For example, a user equipment device may be a personal computer.

In some embodiments, selected portions of device 100, such as circuitry elements, data, or both, may be selectively destroyed or erased in response to an initiation command or signal provided via a user equipment device. For example, keys stored in registers 112 (e.g., key storage registers) may be selectively destroyed or erased by inducing latch-up in specific circuitry elements (e.g., transistors) in response to an initiation signal provided by core 102 of device 100. In an example, the initiation signal may be provided by core 102 of device 100 in response to a user inputting a specific command code into, for example, a controller state-machine that is designed into a silicon substrate. In another example, the initiation signal may be provided by core 102 in response to an attack (e.g., a tampering event). Further details regarding various tamper detection circuitry, anti-tamper options, and anti-tamper operations are discussed in co-pending, commonly-assigned U.S. patent application Ser. Nos. 13/097816, 13/097205, 13/098315, 13/098074, and 13/098316 which are hereby incorporated by reference herein in their respective entireties.

Figure 2:
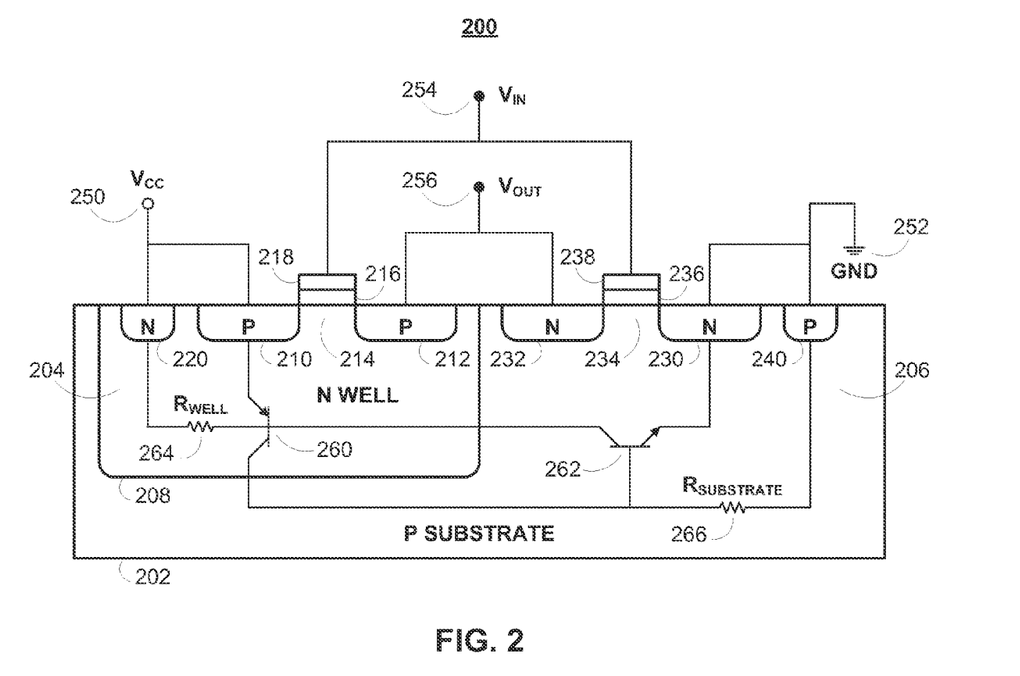
FIG. 2 is a schematic diagram of an illustrative CMOS structure in accordance with some embodiments.

FIG. 2 is a schematic diagram of an illustrative CMOS structure 200. CMOS structure 200 may be included in, for example, programmable integrated circuit device 100 shown in FIG. 1.

CMOS structure 200 may be fabricated on a semiconductor substrate (e.g., silicon, silicon on insulator ("SOI"), germanium, gallium arsenide, or any other suitable substrate) using traditional integrated circuit fabrication processes (e.g., oxidation, doping, deposition, photolithography, etching, any other suitable process, or any combination thereof). CMOS structure 200 may include positively doped ("p-type") regions (e.g., intrinsic silicon doped with boron) and negatively doped ("n-type") regions (e.g., intrinsic silicon doped with arsenic, phosphorus, or antimony). In some embodiments, CMOS structure 200 may be fabricated on an extrinsic (e.g., bulk n-type or p-type) substrate.

CMOS structure 200 may include, for example, extrinsic p-type substrate 202 (labeled "P SUBSTRATE"), p-type metal oxide semiconductor field effect ("PMOS") transistor 204, and n-type metal oxide semiconductor field effect ("NMOS") transistor 206.

PMOS transistor 204 may include, for example, n-type well ("n-well") region 208 (labeled "N WELL"), p-type source region 210, p-type drain region 212, n-type channel region 214, gate insulation region 216, and gate region 218.

NMOS transistor 206 may include, for example, n-type source region 230, n-type drain region 232, p-type channel region 234, gate insulation region 236, and gate region 238.

In an illustrative example, CMOS structure 200 may be a CMOS inverter with p-type source region 210 coupled to positive supply voltage 250 (e.g., $V_{CC}$, $V_{DD}$), n-type source region 230 coupled to negative supply voltage 252 (e.g., ground ("GND"), $V_{SS}$), gate region 218 and gate region 238 coupled to input voltage 254 (e.g., $V_{IN}$), and p-type drain region 212 and n-type drain region 232 coupled to output voltage 256 (e.g., $V_{OUT}$).

When input voltage 254 is low, a low gate voltage may be applied to gate regions 218 and 238, which may result in n-type channel region 214 entering a low resistance state and p-type channel region 234 entering a high resistance state. Thus, PMOS transistor 204 will conduct and NMOS 206 will not conduct in the presence of a low gate voltage applied to gate regions 218 and 238, which may result in output voltage 256 registering a high voltage.

When input voltage 254 is high, a high gate voltage may be applied to gate regions 218 and 238, which may result in n-type channel region 214 entering a high resistance state and p-type channel region 234 entering a low resistance state. Thus, NMOS transistor 206 will conduct and PMOS 204 will not conduct in the presence of a high gate voltage applied to gate regions 218 and 238, which may result in output voltage 256 registering a low voltage.

P-type drain region 212 of PMOS transistor 204 and n-type drain region 232 of NMOS transistor 206 are complementary; when input voltage 254 is low, output voltage 250 is high, and when input voltage 254 is high, output voltage 250 is low. Thus, the output of CMOS structure 200 (e.g., output voltage 256) is the inversion of the input to CMOS structure 200 (e.g., input voltage 254).

CMOS structure 200 may inherently contain parasitic PNP bipolar transistor 260 and parasitic NPN bipolar transistor 262, with parasitic resistor 264 (labeled "$R_{WELL}$") and parasitic resistor 266 (labeled "$R_{SUBSTRATE}$"). Under steady-state CMOS operation, parasitic bipolar transistors 260 and 262 may be inactive since they are not forward-biased (e.g., $V_{BE}$=0). Under transient conditions (e.g., transients occurring on gate regions 218 and 238 or on drain regions 212 and 232), latch-up may occur if parasitic bipolar transistors 260 and 262 begin to conduct (e.g., $V_{BE}$>0.7 volts). Latch-up may result in catastrophic failure of CMOS structure 200 because the latch-up effect is regenerative. During latch-up, parasitic bipolar transistors 260 and 262 may behave like a thyristor, which can carry large currents and short positive supply voltage 250 to negative supply voltage 252.

In some embodiments, PMOS transistor 204 may include n-type n-well tap ("n-tap") region 220 and NMOS transistor 206 may include p-type substrate tap ("p-tap") region 240 to prevent latch-up. For example, p-tap region 240 may be connected to the most negative voltage available on the device (e.g., ground) and n-tap region 220 may be connected to the most positive voltage available on the device (e.g., $V_{CC}$) to prevent latch-up by ensuring that all junctions remain reverse-biased.

Illustrative data destruction systems operable to induce latch-up in accordance with some embodiments of the present disclosure are described with reference to FIGS. 3-5.

Figure 3:
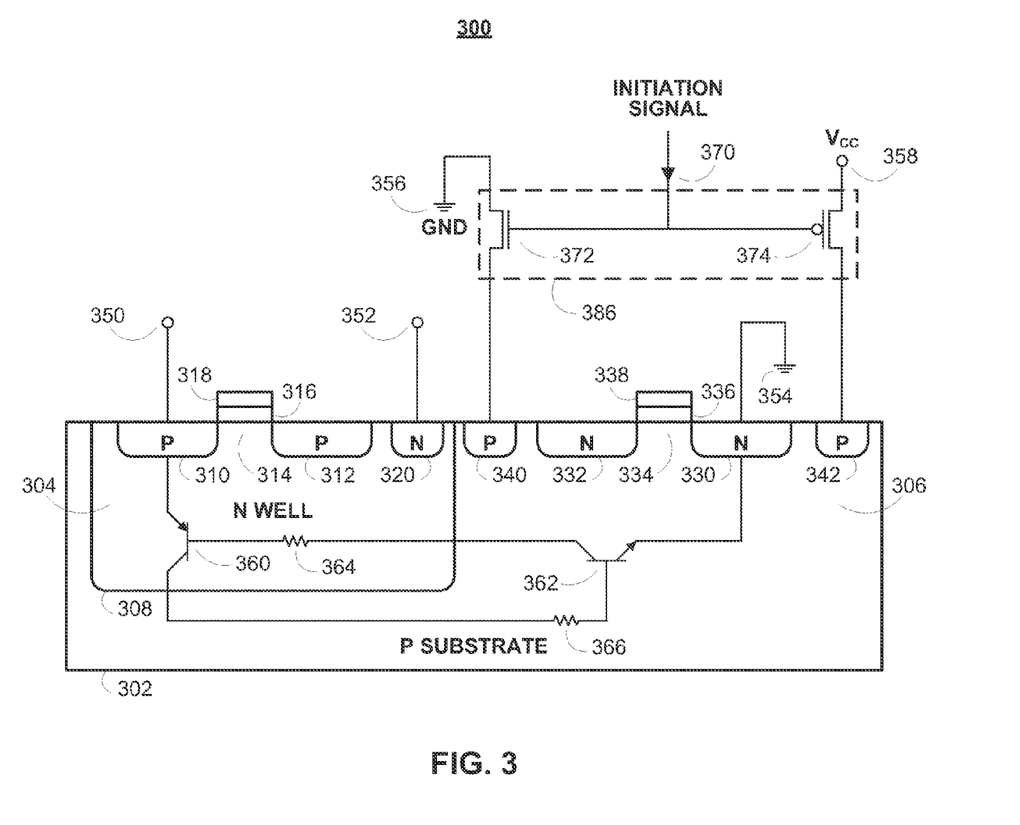
FIG. 3 is a schematic diagram of an illustrative data destruction system in accordance with some embodiments.

FIG. 3 is a schematic diagram of an illustrative data destruction system 300 having circuitry destruction capabilities. Data destruction system 300 is one example of a suitable architecture having data destruction capabilities. Data destruction system 300 may be implemented in, for example, programmable integrated circuit device 100 shown in FIG. 1. In some embodiments, data destruction system 300 may include specific transistors that may be controlled by user intellectual property (e.g., core 102) to destroy or erase selected portions of device 100, such as data, circuitry elements, or both (e.g., key storage registers, SRAM remanence), by inducing latch-up in specific circuitry elements (e.g., transistors, SRAM) in accordance with some embodiments of the present disclosure. In some embodiments, other architectures may be used and may include more or fewer components than those illustrated.

In an illustrative example, the control block (e.g., control block 110 shown in FIG. 1) may disable data that is accessible through the JTAG I/O port (e.g., a JTAG I/O port in periphery 104 shown in FIG. 1) during power up. If this disable mechanism is overridden, a signal may be asserted to the core (e.g., core 102 shown in FIG. 1), where the user IP may then assess a course of action. If the user IP deems the override attempt to be a threat, it may then clear the volatile key, or any combination of suitable elements, and initiate data destruction system 300 to further destroy or erase the possibility of gaining access to sensitive information e.g., the key value, stored therein.

Data destruction system 300 may include any suitable hardware, software, or both for destroying or erasing selected portions (e.g., circuitry elements, data) of an integrated circuit device. In some embodiments, data destruction system 300 may include CMOS structure 302 coupled to logic circuitry 386 capable of partially or wholly destroying CMOS structure 302 in response to initiation signal 370. For example, CMOS structure 302 may contain sensitive information, such as a volatile key, and data destruction system 300 may destroy CMOS structure 302 or erase data stored therein in response to initiation signal 370.

CMOS structure 302 may be fabricated on a semiconductor substrate using traditional integrated circuit fabrication processes. CMOS structure 302 may include p-type regions and negatively doped n-type regions. In some embodiments, CMOS structure 302 may be fabricated on an extrinsic substrate. For example, CMOS structure 302 may be fabricated on an extrinsic p-type substrate (labeled "P SUBSTRATE").

CMOS structure 302 may include, for example, PMOS transistor 304 and NMOS transistor 306. PMOS transistor 304 may include, for example, n-type well region 308 (labeled "N WELL"), p-type source region 310, p-type drain region 312, n-type channel region 314, gate insulation region 316, gate region 318, and n-tap region 320. NMOS transistor 306 may include, for example, n-type source region 330, n-type drain region 332, p-type channel region 334, gate insulation region 336, gate region 338, p-tap region 340, and p-tap region 342. In some embodiments, p-tap regions 340 and 342 may be a single p-tap region. In some embodiments, NMOS transistor 306 may include a p-type well region.

CMOS structure 302 may inherently contain parasitic PNP bipolar transistor 360 and parasitic NPN bipolar transistor 362, with parasitic resistor 364 (e.g., $R_{WELL}$) and parasitic resistor 366 (e.g., $R_{SUBSTRATE}$). Latch-up may occur if parasitic bipolar transistors 360 and 362 begin to conduct (e.g., $V_{BE}>0.7$ volts).

In some embodiments, p-type source region 310 may be coupled to positive supply voltage 350, n-tap region 320 may be coupled to positive supply voltage 352, n-type source region 330 may be coupled to negative supply voltage 354, gate region 318 and gate region 338 may be coupled to an input voltage, and p-type drain region 312 and n-type drain region 332 may be coupled to an output voltage.

In some embodiments, data destruction system 300 may be operable to destroy CMOS structure 302 by inducing latch-up. For example, data destruction system 300 may include NMOS transistor 372, PMOS transistor 374, any other suitable component, or any combination thereof. For example, p-tap region 340 may be coupled to negative supply voltage 356 via NMOS transistor 372 and p-tap region 342 may be coupled to positive supply voltage 358 via PMOS transistor 374.

In some embodiments, data destruction system 300 may be in a non-destructive operating state. The non-destructive operating state may be characterized by a high voltage on line 370. The high voltage on line 370 may be applied to the gate regions of transistors 372 and 374. Accordingly, NMOS transistor 372 may initially be in a conductive state and PMOS transistor 374 may initially be in a non-conductive state. Thus, under non-destructive operation, NMOS transistor 306 may be coupled to negative supply voltage 356 and parasitic bipolar transistors 360 and 362 may be inactive since they are not forward-biased (e.g., $V_{BE}=0$).

In some embodiments, data destruction system 300 may enter a destructive operating state. The state may be induced by pulling-down the voltage on line 370 to a low voltage in response to an initiation signal (e.g., a user-inputted command code, a tampering event). The low voltage on line 370 may be applied to the gate regions of transistors 372 and 374. Accordingly, NMOS transistor 372 may enter a non-conductive state, disabling the connection of p-tap region 340 to negative supply voltage 356 and allowing the voltage of the substrate to float. PMOS transistor 374 may enter a conductive state, enabling the connection of p-tap region 342 to positive supply voltage 358 and raising the voltage of the substrate. Thus, under destructive operation, NMOS transistor 306 may become coupled to positive supply voltage 358 and parasitic bipolar transistors 360 and 362 may begin to conduct as they become forward-biased (e.g., $V_{BE}>0.7$ volts, $V_{N\_WELL}<V_{CC}-0.7$ volts). Latch-up may result in catastrophic failure of CMOS structure 302 because the latch-up effect is regenerative.

Figure 4:
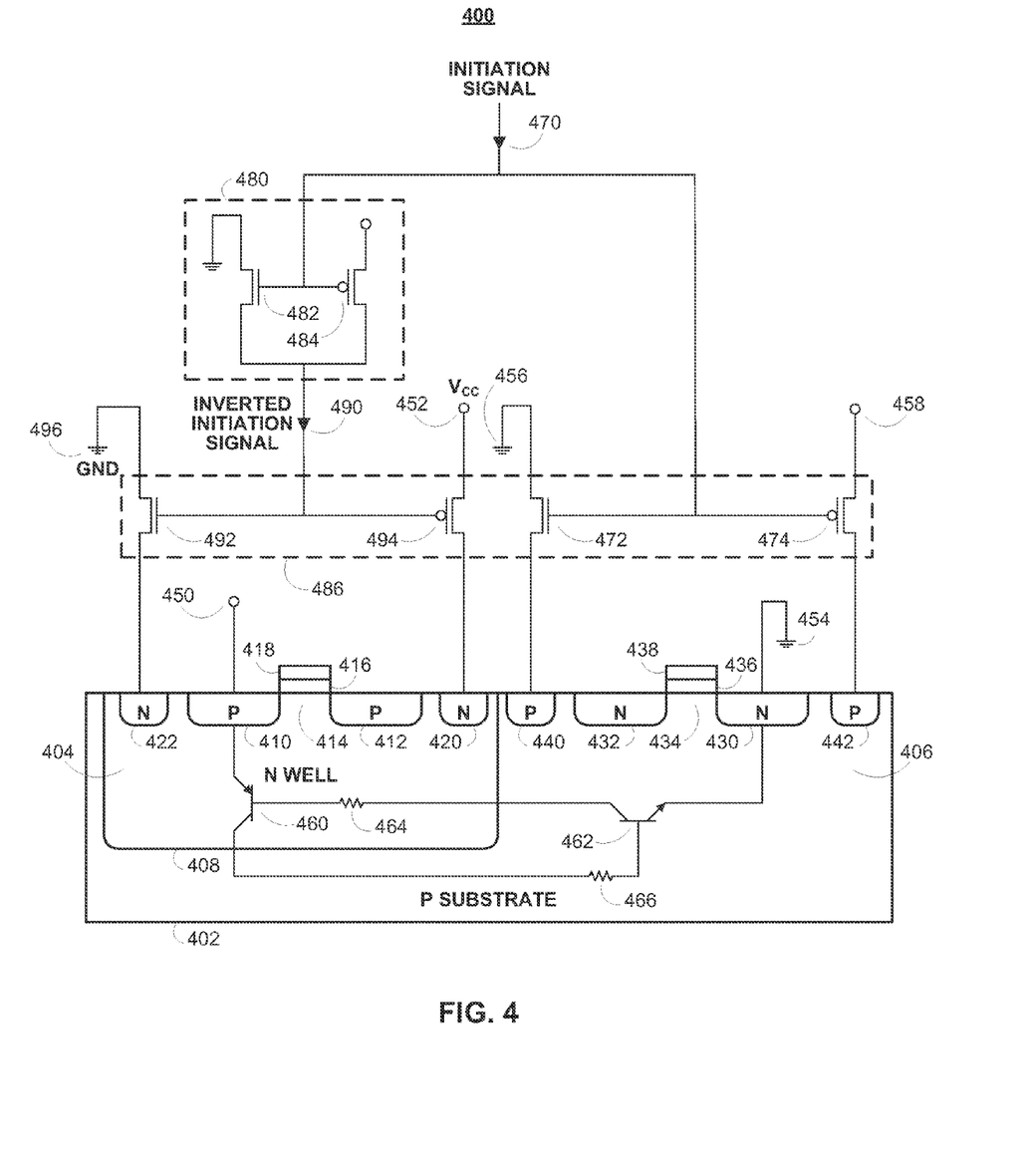
FIG. 4 is a schematic diagram of an alternate illustrative data destruction system in accordance with some embodiments.

FIG. 4 is a schematic diagram of an alternate illustrative data destruction system 400 having data destruction capabilities in accordance with some embodiments of the present disclosure. Data destruction system 400 is one example of a suitable architecture having circuitry destruction capabilities. Data destruction system 400 may be implemented in, for example, programmable integrated circuit device 100 shown in FIG. 1. For example, data destruction system 400 may include specific transistors that may be controlled by user intellectual property to destroy or erase selected portions of device 100, such as data, circuitry elements, or both (e.g., key storage registers), by inducing latch-up in specific circuitry elements (e.g., transistors) in accordance with some embodiments of the present disclosure. In some embodiments, other architectures may be used and may include more or fewer components than those illustrated.

Data destruction system 400 may include any suitable hardware, software, or both for destroying or erasing selected portions (e.g., circuitry elements, data) of a programmable integrated circuit device. In some embodiments, data destruction system 400 may include CMOS structure 402 coupled to logic circuitry capable of partially or wholly destroying CMOS structure 402 in response to an initiation signal 470. For example, CMOS structure 402 may be coupled to logic circuitry 486 operable to decouple the substrate of CMOS structure 402 from ground, decouple the well region of CMOS structure 402 from $V_{CC}$, and induce latch-up.

CMOS structure 402 may be fabricated on a semiconductor substrate using traditional integrated circuit fabrication processes. CMOS structure 402 may include p-type regions and negatively doped n-type regions. In some embodiments, CMOS structure 402 may be fabricated on an extrinsic substrate. For example, CMOS structure 402 may be fabricated on an extrinsic p-type substrate (labeled "P SUBSTRATE").

CMOS structure 402 may include, for example, PMOS transistor 404 and NMOS transistor 406. PMOS transistor 404 may include, for example, n-type well region 408 (labeled "N WELL"), p-type source region 410, p-type drain region 412, n-type channel region 414, gate insulation region 416, gate region 418, n-tap region 420, and n-tap region 422. In some embodiments, n-tap regions 420 and 422 may be a single n-tap region. NMOS transistor 406 may include, for example, n-type source region 430, n-type drain region 432, p-type channel region 434, gate insulation region 436, gate region 438, p-tap region 440, and p-tap region 442. In some embodiments, NMOS transistor 406 may include a p-type well region.

CMOS structure 402 may inherently contain parasitic PNP bipolar transistor 460 and parasitic NPN bipolar transistor 462, with parasitic resistor 464 (e.g., $R_{WELL}$) and parasitic resistor 466 (e.g., $R_{SUBSTRATE}$). Latch-up may occur if parasitic bipolar transistors 460 and 462 begin to conduct (e.g., $V_{BE}>0.7$ volts).

In some embodiments, p-type source region 410 may be coupled to positive supply voltage 450, n-type source region 430 may be coupled to negative supply voltage 454, gate region 418 and gate region 438 may be coupled to an input voltage, and p-type drain region 412 and n-type drain region 432 may be coupled to an output voltage.

In some embodiments, data destruction system 400 may be operable to destroy CMOS structure 402 by inducing latch-up. For example, data destruction system 400 may include NMOS transistor 472, PMOS transistor 474, inverter 480, NMOS transistor 492, PMOS transistor 494, any other suitable component, or any combination thereof. For example, p-tap region 440 may be coupled to negative supply voltage 456 via NMOS transistor 472 and p-tap region 442 may be coupled to positive supply voltage 458 via PMOS transistor 474. In another example, n-tap region 420 may be coupled to positive supply voltage 452 via PMOS transistor 494 and n-tap region 422 may be coupled to negative supply voltage 496 via NMOS transistor 492.

In some embodiments, data destruction system 400 may be in a non-destructive operating state. The non-destructive operating state may be exemplified by a high voltage on line 470. In some embodiments, the high voltage on line 470 may be applied to the gate regions of transistors 472 and 474. Accordingly, NMOS transistor 472 may initially be in a conductive state and PMOS transistor 474 may initially be in a non-conductive state. Thus, under non-destructive operation, NMOS transistor 406 may be coupled to negative supply voltage 456 and parasitic bipolar transistors 460 and 462 may be inactive since they are not forward-biased (e.g., $V_{BE}=0$).

In some embodiments, the non-destructive operating state may be exemplified by applying a high voltage on line 470 as input to inverter 480, which may output a low voltage signal on line 490. Inverter 480 may include NMOS transistor 482, PMOS transistor 484, any other suitable circuitry (e.g., an NMOS transistor and a resistor, a PMOS transistor and a resistor, bipolar junction transistors), or any combination or configuration thereof. The low voltage on line 490 may be applied to the gate regions of transistors 492 and 494. Accordingly, NMOS transistor 492 may initially be in a non-conductive state and PMOS transistor 494 may initially be in a conductive state. Thus, under non-destructive operation, PMOS transistor 404 may be coupled to positive supply voltage 452 and parasitic bipolar transistors 460 and 462 may be inactive since they are not forward-biased (e.g., $V_{BE}=0$).

In some embodiments, data destruction system 400 may enter a destructive operating state. The destructive operating state may be induced by pulling-down the voltage on line 470 to a low voltage in response to an initiation signal (e.g., a user-inputted command code, a tampering event). The low voltage on line 470 may be applied to the gate regions of transistors 472 and 474. Accordingly, NMOS transistor 472 may enter a non-conductive state, disabling the connection of p-tap region 440 to negative supply voltage 456 and allowing the voltage of the substrate to float. PMOS transistor 474 may enter a conductive state, enabling the connection of p-tap region 442 to positive supply voltage 458 and raising the voltage of the substrate. Thus, under destructive operation, NMOS transistor 406 may become coupled to positive supply voltage 458 and parasitic bipolar transistors 460 and 462 may begin to conduct as they become forward-biased (e.g., $V_{BE}>0.7$ volts, $V_{N\_WELL}<V_{CC}-0.7$ volts). Latch-up may result in catastrophic failure of CMOS structure 402 because the latch-up effect is regenerative.

In some embodiments, the destructive operating state may be induced by applying a low voltage on line 470 as input to inverter 480, which may output a high voltage signal on line 490. The high voltage on line 490 may be applied to the gate regions of transistors 492 and 494. Accordingly, PMOS transistor 494 may enter a non-conductive state, disabling the connection of n-tap region 420 to positive supply voltage 452. NMOS transistor 492 may enter a conductive state, enabling the connection of n-tap region 422 to negative supply voltage 496 and lowering the voltage of the substrate. Thus, under destructive operation, PMOS transistor 404 may become coupled to negative supply voltage 496 and parasitic bipolar transistors 460 and 462 may begin to conduct as they become forward-biased (e.g., $V_{BE}>0.7$ volts, $V_{N\_WELL}<V_{CC}-0.7$ volts). Latch-up may result in catastrophic failure of CMOS structure 402 because the latch-up effect is regenerative.

Figure 5:
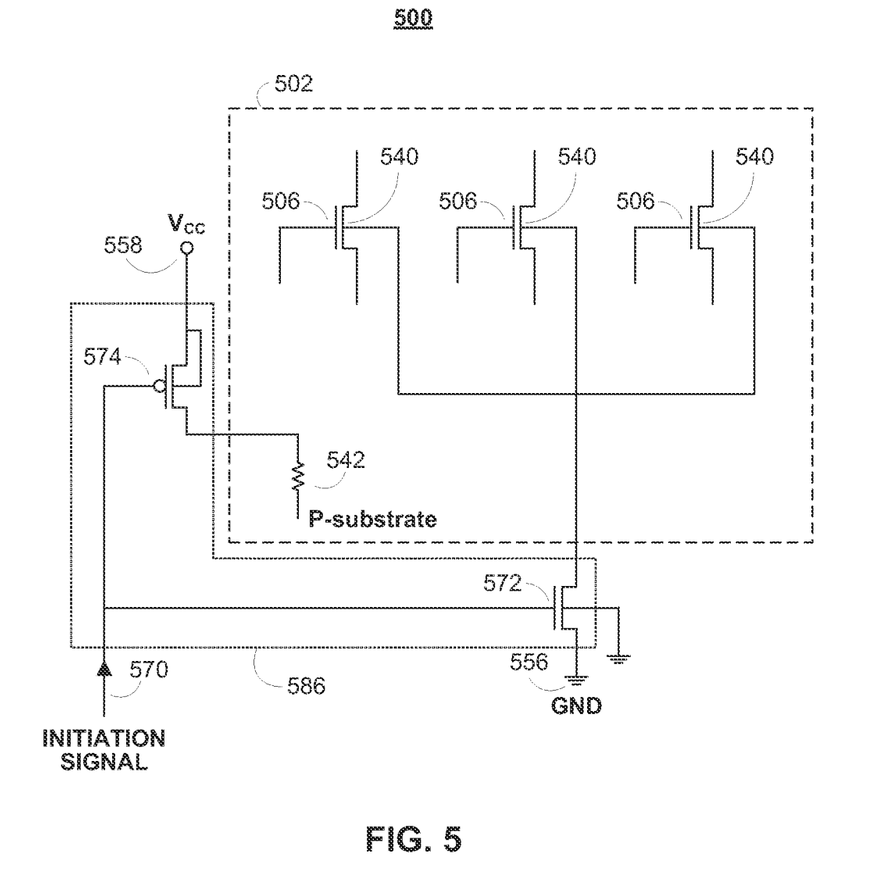
FIG. 5 is a functional circuit diagram of an illustrative data destruction system in accordance with some embodiments.

FIG. 5 is a functional circuit diagram of an illustrative data destruction system 500 having circuitry destruction capabilities in accordance with some embodiments of the present disclosure. Data destruction system 500 is one example of a suitable architecture having data destruction capabilities. Data destruction system 500 may be implemented in, for example, programmable integrated circuit device 100 shown in FIG. 1. For example, data destruction system 500 may include transistors that may be controlled by user intellectual property to destroy or erase selected portions of device 100, such as data, circuitry elements, or both (e.g., key storage registers), by inducing latch-up in specific circuitry elements (e.g., transistors) in accordance with some embodiments of the present disclosure. In some embodiments, other architectures may be used and may include more or fewer components than those illustrated.

Data destruction system 500 may include any suitable hardware, software, or both for destroying or erasing selected portions of a programmable integrated circuit device. In some embodiments, data destruction system 500 may include CMOS structure 502 coupled to logic circuitry 586 capable of partially or wholly destroying CMOS structure 502 in response to initiation signal 570. For example, CMOS structure 502 may be coupled to logic circuitry operable to decouple the substrate of CMOS structure 502 from ground and induce latch-up.

CMOS structure 502 may be fabricated on a semiconductor substrate using traditional integrated circuit fabrication processes. CMOS structure 502 may include p-type regions and negatively doped n-type regions. In some embodiments, CMOS structure 502 may be fabricated on an extrinsic substrate. For example, CMOS structure 502 may be fabricated on an extrinsic p-type substrate.

CMOS structure 502 may include, for example, one or more NMOS transistors 506, resistive connection 542, any other suitable circuitry (e.g., one or more PMOS transistors, one or more additional diodes, one or more doped regions), or any combination thereof. One or more NMOS transistors 506 may include, for example, one or more p-tap regions 540, any other suitable circuitry, or any combination thereof. Resistive connection 542 may include, for example, a p-tap region located in a p-well or an extrinsic p-type substrate to provide a resistive connection to, for example, the p-well substrate.

CMOS structure 502 may inherently contain parasitic PNP and NPN bipolar transistors, with parasitic well and substrate resistors. Latch-up may occur if parasitic bipolar transistors begin to conduct (e.g., $V_{BE}>0.7$ volts).

In some embodiments, data destruction system 500 may be operable to destroy CMOS structure 502 by inducing latch-up. For example, data destruction system 500 may include NMOS transistor 572, PMOS transistor 574, any other suitable component, or any combination thereof. For example, one or more p-tap regions 540 may be coupled to negative supply voltage 556 via NMOS transistor 572 and resistive connection 542 may be coupled to positive supply voltage 558 via PMOS transistor 574.

In some embodiments, data destruction system 500 may be in a non-destructive operating state. The non-destructive operating state may be exemplified by a high voltage on line 570. The high voltage on line 570 may be applied to the gate regions of transistors 572 and 574. Accordingly, NMOS transistor 572 may initially be in a conductive state and PMOS transistor 574 may initially be in a non-conductive state. Thus, under non-destructive operation, one or more NMOS transistors 506 may be coupled to negative supply voltage 556 and the parasitic bipolar transistors may be inactive since they are not forward-biased (e.g., $V_{BE}=0$).

In some embodiments, data destruction system 500 may enter a destructive operating state. The destructive operating state may be induced by pulling-down the voltage on line 570 to a low voltage in response to an initiation signal (e.g., a user-inputted command code, a tampering event). The low voltage on line 570 may be applied to the gate regions of transistors 572 and 574. Accordingly, NMOS transistor 572 may enter a non-conductive state, disabling the connection of one or more p-tap regions 540 to negative supply voltage 556 and allowing the voltage of the substrate to float. PMOS transistor 574 may enter a conductive state, enabling the connection of resistive connection 542 to positive supply voltage 558 and raising the voltage of the substrate. Thus, under destructive operation, one or more NMOS transistors 506 may become coupled to positive supply voltage 558 and the parasitic bipolar transistors may begin to conduct as they become forward-biased (e.g., $V_{BE}>0.7$ volts, $V_{N\_WELL}<V_{CC}-0.7$ volts). Latch-up may result in catastrophic failure of CMOS structure 502 because the latch-up effect is regenerative.

Figure 6:
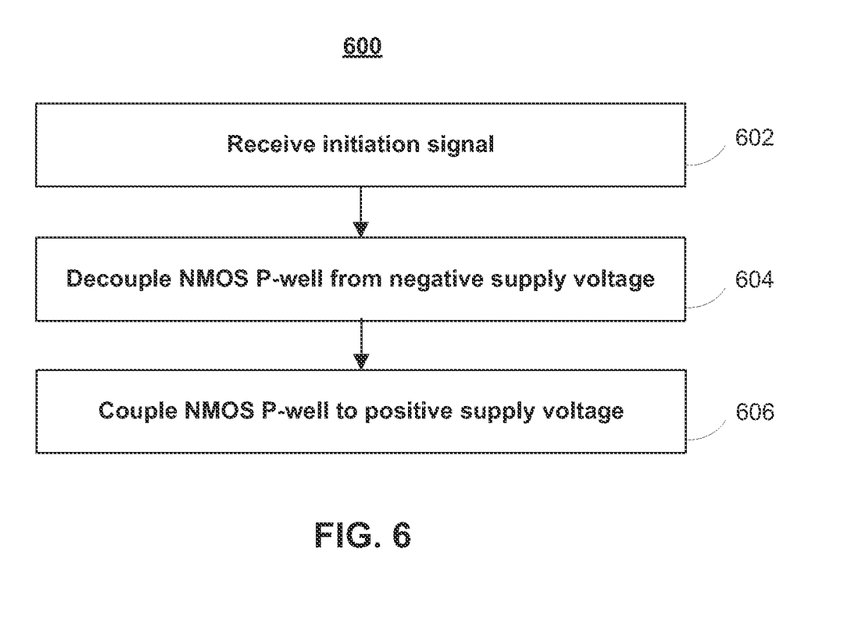
FIG. 6 is a flow chart of illustrative steps performed to destroy or erase selected portions of an integrated circuit device in accordance with some embodiments.

FIG. 6 shows illustrative process 600 for destroying or erasing selected portions of an integrated circuit device in accordance with some embodiments of the present disclosure. In some embodiments, core 102 shown in FIG. 1, any other suitable component or circuitry, or any combination thereof may provide an initiation signal (e.g., a signal on line 370 shown in FIG. 3, line 470 shown in FIG. 4, line 490 shown in FIG. 4, line 570 shown in FIG. 5) in response to, for example, a user inputting a command using a user equipment device, electronic circuitry detecting a tamper event, any other suitable action, or any combination thereof.

At step 602, the data destruction system may receive the initiation signal, through any suitable communications path, network, or both in accordance with some embodiments of the present disclosure. The initiation signal may be, for example, a low voltage signal on an initially high voltage signal line.

At step 604, the data destruction system may decouple a circuitry element, such as a transistor (e.g., NMOS transistor 306 shown in FIG. 3, 406 shown in FIG. 4, 506 shown in FIG. 5), from a negative voltage supply, allowing the voltage of the substrate to float. For example, a low voltage on line 370 shown in FIG. 3 may be applied to the gate region of transistor 372. Accordingly, NMOS transistor 372 may enter a non-conductive state, disabling the connection of p-tap region 340 to negative supply voltage 356 and allowing the voltage of the substrate to float.

At step 606, the data destruction system may couple the decoupled circuitry element to a positive voltage supply, allowing the voltage of the substrate to increase. For example, a low voltage on line 370 shown in FIG. 3 may be applied to the gate region of transistor 374. Accordingly, PMOS transistor 374 may enter a conductive state, enabling the connection of p-tap region 342 to positive supply voltage 358 and raising the voltage of the substrate.

As a result of steps performed in illustrative process 600, latch-up may be induced in the circuitry element and may cause the circuitry element, data, or both to be destroyed or erased. For example, NMOS transistor 306 shown in FIG. 3 may become decoupled from negative supply voltage 356 and coupled to positive supply voltage 358. Parasitic bipolar transistors 360 and 362 may then begin to conduct as they become forward-biased (e.g., $V_{BE}>0.7$ volts, $V_{N\_WELL}<V_{CC}-0.7$ volts). Latch-up may result in catastrophic failure of CMOS structure 302 because the latch-up effect is regenerative.

Figure 7:
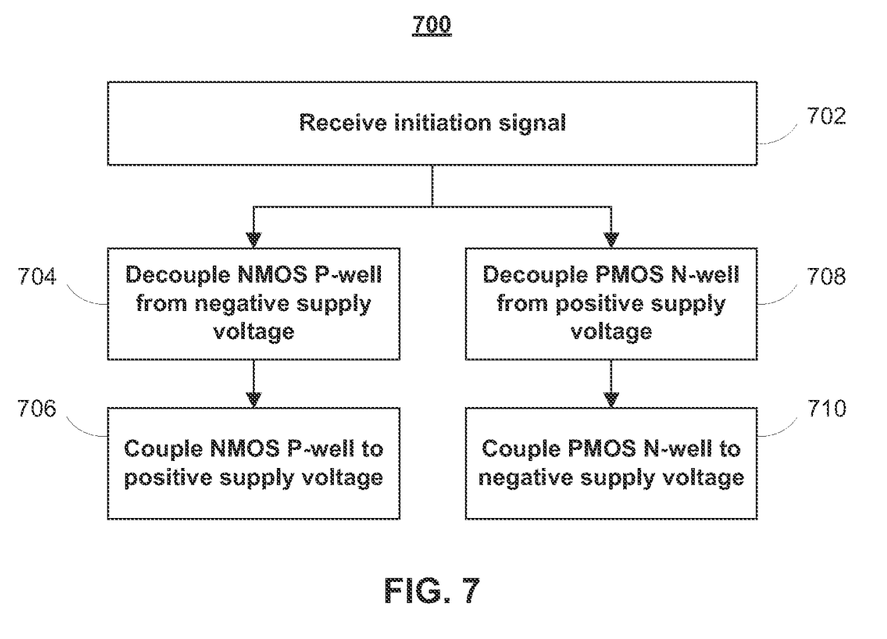
FIG. 7 is a flow chart of alternate illustrative steps performed to destroy or erase selected portions of an integrated circuit device in accordance with some embodiments.

FIG. 7 shows alternate illustrative process 700 for destroying or erasing selected portions of an integrated circuit device in accordance with some embodiments of the present disclosure. In some embodiments, core 102 shown in FIG. 1, any other suitable component or circuitry, or any combination thereof may provide an initiation signal (e.g., a signal on line 370 shown in FIG. 3, line 470 shown in FIG. 4, line 490 shown in FIG. 4, line 570 shown in FIG. 5) in response to, for example, a user inputting a command using a user equipment device, electronic circuitry detecting a tamper event, any other suitable action, or any combination thereof.

At step 702, the data destruction system may receive the initiation signal, through any suitable communications path, network, or both in accordance with some embodiments of the present disclosure. The initiation signal may be, for example, a low voltage signal on an initially high voltage signal line.

At step 704, the data destruction system may decouple a first circuitry element, such as an NMOS transistor (e.g., NMOS transistor 306 shown in FIG. 3, NMOS transistor 406 shown in FIG. 4, NMOS transistor 506 shown in FIG. 5), from a negative voltage supply, allowing the voltage of the substrate to float. For example, a low voltage on line 470 shown in FIG. 4 may be applied to the gate region of transistor 472. Accordingly, NMOS transistor 472 may enter a non-conductive state, disabling the connection of p-tap region 440 to negative supply voltage 456 and allowing the voltage of the substrate to float.

At step 706, the data destruction system may couple the decoupled first circuitry element to a positive voltage supply, allowing the voltage of the substrate to increase. For example, a low voltage on line 470 shown in FIG. 4 may be applied to the gate region of transistor 474. Accordingly, PMOS transistor 474 may enter a conductive state, enabling the connection of p-tap region 442 to positive supply voltage 458 and raising the voltage of the substrate.

At step 708, the data destruction system may decouple a second circuitry element, such as a PMOS transistor (e.g., PMOS transistor 304 shown in FIG. 3, PMOS transistor 404 shown in FIG. 4), from a positive voltage supply, allowing the voltage of the n-type well region to decrease. For example, a low voltage on line 470 shown in FIG. 4 may be applied as input to inverter 480, which may output a high voltage signal on line 490 (e.g., a inverted initiation signal). The high voltage on line 490 may be applied to the gate region of PMOS transistor 494. Accordingly, PMOS transistor 494 may enter a non-conductive state, disabling the connection of n-tap region 420 to positive supply voltage 452 and allowing the voltage of well region 408 to decrease.

At step 710, the data destruction system may couple the decoupled second circuitry element to a negative voltage supply, allowing the voltage of the substrate to decrease. For example, a high voltage on line 490 shown in FIG. 4 may be applied to the gate region of NMOS transistor 492. Accordingly, NMOS transistor 492 may enter a conductive state, enabling the connection of n-tap region 422 to negative supply voltage 496 and lowering the voltage of the substrate.

As a result of steps performed in illustrative process 700, latch-up may be induced in the first and second circuitry elements and may cause the first circuitry element, the second circuitry element, data, any other suitable element, or any combination thereof to be destroyed or erased. The destruction of the first circuitry element, the second circuitry element, or both may be indicated by the initiating signal. In some embodiments, the initiating signal may indicate destruction of first, second, and fourth circuitry elements in one embodiment, and destruction of first and fourth circuitry elements in a different embodiment. In other words, the system described herein is programmable. For example, NMOS transistor 406 shown in FIG. 4 may become decoupled from negative supply voltage 456 and coupled to positive supply voltage 458. PMOS transistor 404 shown in FIG. 4 may become decoupled from positive supply voltage 452 and coupled to negative supply voltage 496. Parasitic bipolar transistors 460 and 462 may then begin to conduct as they become forward-biased (e.g., $V_{BE}>0.7$ volts, $V_{N\_WELL}<V_{CC}-0.7$ volts). Latch-up may result in catastrophic failure of CMOS structure 402 because the latch-up effect is regenerative.

It will be understood that the foregoing is only illustrative of the principles of the disclosure, and that the disclosure may be practiced by other than the described embodiments, which are presented for purposes of illustration and not of limitation. It will also be understood that any component discussed herein may include any suitable hardware, software, or any combination thereof.

What is claimed is:

1. An integrated circuit device comprising:
   a circuitry element operable to store data; and
   logic circuitry coupled to the circuitry element, the logic circuitry operable to:
      receive an initiation signal, selectively generated by circuitry within the integrated circuit device, to destroy the circuitry element, and
      induce latch-up in the circuitry element responsive to the initiation signal, wherein the logic circuitry is operative to decouple the circuitry element from a first supply voltage and to couple the circuitry element to a second supply voltage based on the initiation signal.

2. The integrated circuit device of claim 1, wherein the circuitry element is coupled to a negative supply voltage, and wherein the logic circuitry comprises:
   a first transistor coupled to the circuitry element and the negative supply voltage, wherein the first transistor comprises an input operative to receive the initiation signal; and
   a second transistor coupled to the circuitry element and a positive supply voltage, wherein the second transistor comprises an input operative to receive the initiation signal;
   wherein the logic circuitry is further operable to:
      decouple the circuitry element from the negative supply voltage based at least in part on operation of the first transistor, and
      couple the circuitry element that is decoupled from the negative supply voltage to the positive supply voltage based at least in part on operation of the second transistor.

3. The integrated circuit device of claim 1, wherein the initiation signal is a low voltage signal.

4. The integrated circuit device of claim 1, wherein the integrated circuit device is a programmable integrated circuit device.

5. The integrated circuit device of claim 1, wherein the circuitry element comprises a CMOS structure.

6. The integrated circuit device of claim 1, wherein the circuitry element comprises a volatile memory element.

7. The integrated circuit device of claim 6, wherein the volatile memory element is operable to store a volatile key.

8. The integrated circuit device of claim 1, wherein the circuitry element comprises a nonvolatile memory element.

9. The integrated circuit device of claim 1, wherein the initiation signal is generated in response to a user command.

10. The integrated circuit device of claim 1, wherein the initiation signal is generated in response to a tampering event.

11. A method for destroying a selected portion of an integrated circuit device, the method comprising:
    receiving an initiation signal, selectively generated by circuitry within the integrated circuit device, to destroy a circuitry element;
    inducing latch-up in the circuitry element responsive to the initiation signal;
    decoupling the circuitry element from a first supply voltage; and
    coupling the circuitry element to a second supply voltage based on the initiation signal.

12. The method of claim 11, wherein the circuitry element is coupled to a negative supply voltage, the method further comprising:
    providing the initiation signal to a first transistor coupled to the negative supply voltage and the circuitry element; and
    providing the initiation signal to a second transistor coupled to a positive supply voltage and the circuitry element;
    decoupling the circuitry element from the negative supply voltage based at least in part on operation of the first transistor, and
    coupling the circuitry element that is decoupled from the negative supply voltage to the positive supply voltage based at least in part on operation of the second transistor.

13. The method of claim 11, wherein the initiation signal is a low voltage signal.

14. The method of claim 12, wherein the decoupling the circuitry element from the negative supply voltage comprises decoupling an NMOS transistor from the negative supply voltage.

15. The method of claim 11, wherein the decoupling comprises decoupling a CMOS structure from a negative supply voltage.

16. The method of claim 11, wherein the circuitry element comprises a volatile memory element.

17. The method of claim 11, wherein the circuitry element comprises a nonvolatile memory element.

18. The method of claim 11, wherein the initiation signal is generated in response to one of a user command and a tampering event.

19. A system for destroying a selected portion of an integrated circuit device comprising:
    logic circuitry coupled to a circuitry element, wherein the circuitry element is operable to store data, the logic circuitry operable to:
       receive an initiation signal, selectively generated by circuitry within the integrated circuit device, to destroy the circuitry element; and induce latch-up in the circuitry element responsive to the initiation signal, wherein the logic circuitry is operative to decouple the circuitry element from a first supply voltage and to couple the circuitry element to a second supply voltage based on the initiation signal.

20. The system of claim 19, wherein the circuitry element comprises a volatile key.

21. The integrated circuit device of claim 1, wherein the circuitry within the integrated circuit device is programmable logic circuitry.

* * * * *